(12) United States Patent
Zeigler et al.

(10) Patent No.: US 6,631,480 B2
(45) Date of Patent: Oct. 7, 2003

(54) METHODS AND SYSTEMS FOR PROTECTING DATA FROM POTENTIAL CORRUPTION BY A CRASHED COMPUTER PROGRAM

(75) Inventors: Art Zeigler, Beaverton, OR (US); Scott Elliott, Hillsboro, OR (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/438,020

(22) Filed: Nov. 10, 1999

(65) Prior Publication Data

US 2002/0133738 A1 Sep. 19, 2002

(51) Int. Cl.$^7$ ................................................. G06F 11/00
(52) U.S. Cl. ....................................................... 714/20
(58) Field of Search ............................. 714/15, 19, 20, 714/29

(56) References Cited

U.S. PATENT DOCUMENTS

| 4,514,846 A | 4/1985 | Federico et al. ............... 371/16 |
| 4,521,847 A | 6/1985 | Ziehm et al. ................. 364/184 |

(List continued on next page.)

OTHER PUBLICATIONS

Adaptec, Inc.; GoBack: The Power to Undo PC Problems—product overview; http://www.adaptec.com/products/overview/goback.html; Jul. 21, 2000; pp. 1–3.
Adaptec, Inc.; GoBack: The Power to Undo PC Problems—data sheet; http://www.adaptec.com/products/datasheets/goback.html; Jul. 21, 2000; pp. 1–3.
Adaptec, Inc.; GoBack: The Power to Undo PC Problems on Shared or Workgroup Computers—data sheet; http://www.adaptec.com/products/datasheets/gobackprofessional.html; Jul. 21, 2000; pp. 1–3.

(List continued on next page.)

Primary Examiner—Robert Beausoliel
Assistant Examiner—Bryce P. Bonzo
(74) Attorney, Agent, or Firm—Fliesler Dubb Meyer & Lovejoy LLP

(57) ABSTRACT

The present invention is directed toward creating backup copies of previously saved data before it is modified by a crashed computer program executing in a preemptive multitasking operating system environment. The invention is advantageous in that it protects against data loss and corruption caused by operating system calls issued by malfunctioning, crashed computer programs.

A method in accordance with the invention comprises the steps of: (a) monitoring operating system calls made by a crashed program; (b) intercepting a selected group of operating system calls made by a crashed program before they are executed by an operating system; (c) logging a subset of the selected group of intercepted operating system calls in a memory; (d) creating backup copies of data potentially modified by a further subset of the selected group of intercepted operating system calls; and (e) passing intercepted operating system calls to an operating system.

In one embodiment of the present invention, backup copies of data are stored in backup files extracted from data appended to an undo file. In another embodiment of the present invention, backup copies of data are stored directly in backup files.

37 Claims, 9 Drawing Sheets

U.S. PATENT DOCUMENTS

| | | | |
|---|---|---|---|
| 4,580,232 A | 4/1986 | Dugan et al. | 364/523 |
| 4,589,090 A | 5/1986 | Downing et al. | 364/900 |
| 4,811,216 A | 3/1989 | Bishop et al. | 364/200 |
| 4,827,406 A | 5/1989 | Bischoff et al. | 364/200 |
| 4,870,644 A | 9/1989 | Sherry et al. | 371/16.1 |
| 5,008,853 A | 4/1991 | Bly et al. | 364/900 |
| 5,040,178 A | 8/1991 | Lindsay et al. | 371/21.5 |
| 5,124,989 A | 6/1992 | Padawer et al. | 371/19 |
| 5,276,860 A | 1/1994 | Fortier et al. | 395/575 |
| 5,287,501 A | 2/1994 | Lomet | 395/600 |
| 5,293,612 A | 3/1994 | Shingai | 395/425 |
| 5,321,824 A | 6/1994 | Burke et al. | 395/425 |
| 5,335,344 A | 8/1994 | Hastings | 395/575 |
| 5,410,685 A | 4/1995 | Banda et al. | 395/575 |
| 5,493,649 A | 2/1996 | Slivka et al. | 395/185.01 |
| 5,515,493 A | 5/1996 | Boston et al. | 395/157 |
| 5,526,485 A | 6/1996 | Brodsky | 395/183.14 |
| 5,530,864 A | 6/1996 | Matheny et al. | 395/700 |
| 5,559,980 A | 9/1996 | Connors et al. | 395/427 |
| 5,561,786 A | 10/1996 | Morse | 395/497.01 |
| 5,568,635 A | 10/1996 | Yamaguchi | 395/497.02 |
| 5,581,696 A | 12/1996 | Kolawa et al. | 395/183.14 |
| 5,581,697 A | 12/1996 | Gramlich et al. | 395/183.11 |
| 5,696,897 A | 12/1997 | Dong | 395/182.13 |
| 5,701,484 A | 12/1997 | Artsy | 395/683 |
| 5,712,971 A | 1/1998 | Stanfill et al. | 395/183.1 |
| 5,748,882 A | 5/1998 | Huang | 395/184.01 |
| 5,812,848 A | 9/1998 | Cohen | 395/685 |
| 5,815,702 A * | 9/1998 | Kannan et al. | 712/244 |
| 5,819,022 A | 10/1998 | Bandat | 395/182.14 |
| 5,857,204 A | 1/1999 | Lordi et al. | 707/202 |
| 5,857,207 A | 1/1999 | Lo et al. | 707/203 |
| 5,911,060 A | 6/1999 | Elliott | 395/500 |
| 5,938,775 A * | 8/1999 | Damani et al. | 714/15 |
| 5,974,249 A | 10/1999 | Elliott et al. | 395/500.48 |
| 6,009,258 A * | 12/1999 | Elliott | 703/22 |
| 6,009,414 A | 12/1999 | Hoshiya et al. | 705/30 |
| 6,044,475 A * | 3/2000 | Chung et al. | 714/15 |
| 6,151,569 A | 11/2000 | Elliott | 703/22 |
| 6,173,291 B1 | 1/2001 | Jenevein | 707/200 |
| 6,182,243 B1 | 1/2001 | Berthe et al. | 714/38 |
| 6,269,478 B1 | 7/2001 | Lautenbach-Lampe et al. | 717/4 |
| 6,299,478 B1 | 10/2001 | Jones et al. | 439/571 |
| 6,330,528 B1 * | 12/2001 | Huang et al. | 703/22 |
| 6,389,556 B1 * | 5/2002 | Qureshi | 714/15 |
| 6,405,325 B1 | 6/2002 | Lin et al. | 714/15 |
| 6,438,709 B2 * | 8/2002 | Poisner | 714/23 |
| 6,438,749 B1 * | 8/2002 | Chamberlain | 717/174 |

OTHER PUBLICATIONS

Adaptec, Inc.; GoBack: Product Tour—introducing GoBack; http://www.adaptec.com/products/tour/goback.html; Oct. 16, 2000; pp. 1–2.

Adaptec, Inc.; GoBack: Product Tour—restoring the system, step 1; http://www.adaptec.com/products/tour/goback1a.html; Oct. 16, 2000; pp. 1–2.

Adaptec, Inc.; GoBack: Product Tour—restoring the system, step 2; http://www.adaptec.com/products/tour/goback1b.html; Oct. 16, 2000; pp. 1–3.

Adaptec, Inc.; GoBack: Product Tour—recovering an overwritten file, step 1; http://www.adaptec.com/roducts/tour/goback2a.html; Oct. 16, 2000; pp. 1–2.

Adaptec, Inc.; GoBack: Product Tour—recovering an overwritten file, step 2; http://www.adaptec.com/products/tour/goback2b.html; Oct. 16, 2000; pp. 1–2.

Adaptec, Inc.; GoBack: Product Tour—recovering a deleted file; http://www.adaptec.com/products/tour/goback3.html; Oct. 16, 2000; p. 1.

Adaptec, Inc.; GoBack: Product Tour—viewing your drive as it was in the past; http://www.adaptec.com/products/tour/goback4.html; Oct. 16, 2000; pp. 1–2.

Adaptec, Inc.; GoBack Product Awards; http://www.adaptec.com/products/overview/gobackawards.html; Jul. 21, 2000; pp. 1–3.

Adaptec, Inc.; GoBack Product Reviews; http://www.adaptec.com/products/overview/gobackreviews.html; Jul. 21, 2000; pp. 1–5.

Adaptec, Inc.; What GoBack Users are Saying; http://www.adaptec.com/adaptec/testimonials/goback.html; Jul. 21, 2000; pp. 1–3.

Adaptec, Inc.; ReZOOM: All–In–One Protection To Eliminate PC Downtime—product overview; http://www.adaptec.com/products/overview/rezoom.html; Jul. 21, 2000; pp. 1–3.

Adaptec, Inc.; ReZOOM: All–in–one Protection to Eliminate PC Downtime—ReZOOM Features; http://www.adaptec.com/products/overview/rezoomfeatures.html; Jul. 21, 2000; pp. 1–4.

Adaptec, Inc.; ReZOOM: All–In–One Protection To Eliminate PC Downtime—data sheet; http://www.adaptec.com/products/datasheets/rezoom.html; Jul. 21, 2000; pp. 1–4.

Adaptec, Inc.; ReZOOM: Technology Comparision; http://www.adaptec.com/technology/overview/rezoom.html; Jul. 21, 2000; pp. 1–5.

Adaptec, Inc.; ReZOOM: Product Tour—Setup ReZOOM; http://www.adaptec.com/products/tour/rezoom1.html; Oct. 16, 2000; pp. 1–3.

Adaptec, Inc.; ReZOOM: Product Tour—Setup ReZOOM, cont.; http://www.adaptec.com/products/tour/rezoom1b.html; Oct. 16, 2000; pp. 1–3.

Adaptec, Inc.; ReZOOM: Product Tour—Testing Recovery; http://www.adaptec.com/products/tour/rezoom2.html; Oct. 16, 2000; pp. 1–2.

Adaptec, Inc.; ReZOOM: Product Tour—Using ReZOOM; http://www.adaptec.com/products/tour/rezoom3.html; Oct. 16, 2000; pp. 1–3.

Adaptec, Inc.; ReZOOM: Product Tour—ReZOOM Recovery; http://www.adaptec.com/products/tour/rezoom4.html; Oct. 16, 2000; pp. 1–3.

Adaptec, Inc.; ReZOOM Product FAQs; http://www.adaptec.com/products/faqs/rezoom.html; Jul. 21, 2000; pp. 1–5.

Adaptec, Inc.; ReZOOM Compatibility Update; http://www.adaptec.com/support/compatibility/rezoom.html; Jul. 21, 2000; pp. 1–2.

Adaptec, Inc.; What resellers are saying about ReZOOM; http://www.adaptec.com/adaptec/testimonials/rezoom.html; Jul. 21, 2000; pp. 1–2.

Adaptec, Inc.; ReZOOM Multimedia Presentations: http://www.adaptec.com/products/tour/rezoom_m.html; Jul. 21, 2000 p. 1.

U.S. patent application Ser. No. 09/438,135, Lopez, filed Nov. 10, 1999.

U.S. patent application Ser. No. 09/438,076, Elliott, filed Nov. 10, 1999.

"First Aid® 97, Deluxe User Manual," CyberMedia, Inc., 1996, pp. i–viii, 1–123.

"Vertisoft Fix–It™ For Windows 95, User's Guide," Vertisof Systems, Inc., Jun. 1996, pp. i–vii, 1–86.

"WINProbe 95™ User Guide," Quarterdeck Corp., 1996, pp. i–vi, 1–88.

Brown, L., et al., "Dynamic Snooping in a Fault Tolerant Distributed Shared Memory," IEE, 1994, pp. 218–226.

Pietrek, M., "Windows™ 95 System Programming Secrets™," IDG Books Worldwide, Inc., 1995, pp. 692–694.

Richter, J., "Advanced Windows™, The Developer's Guide to the WIN 32® API for Windows NT™ 3.5 and Windows 95," Microsoft Press, Copyright 1995, pp. 809–838, 848–858.

Simpson, Alan, "Mastering WordPerfect 5.1 and 5.2 for Windows," SYBEX, 1993, pp. 407, 453–455.

Young, M.L., et al., "WordPerfect 6.1 for Windows for Dummies," IDG Books Worldwide, Inc., $2^{nd}$ Ed., 1994, pp. 335, 368.

* cited by examiner

METHODS AND SYSTEMS FOR PROTECTING DATA FROM POTENTIAL CORRUPTION BY A CRASHED COMPUTER PROGRAM

CROSS REFERENCE TO RELATED PATENTS

The disclosures of the following U.S. Patents are incorporated herein by reference:

(A) U.S. Pat. No. 5,911,060 issued Jun. 8, 1999 to Scott Elliott, and entitled, COMPUTER METHOD AND APPARATUS FOR UNFREEZING AN APPARENTLY FROZEN APPLICATION PROGRAM BEING EXECUTED UNDER CONTROL OF AN OPERATING SYSTEM; and (B) U.S. Pat. No. 5,812,848 issued Sep. 22, 1998 to Leonardo Cohen, and entitled, SUBCLASSING SYSTEM FOR COMPUTER THAT OPERATES WITH PORTABLE-EXECUTABLE (PE) MODULES.

CROSS REFERENCE TO CO-PENDING PATENT APPLICATIONS

The disclosures of the following co-pending, U.S. patent applications (each owned by the owner of the present application) are incorporated herein by reference:

(A) U.S. Ser. No. 08/823,675, filed May 29, 1997, by inventor Scott Elliott and John Teddy, which application later issued as U.S. Pat. No. 5,974,249, entitled ZERO FOOTPRINT METHOD AND APPARATUS FOR EXPANDING ALLOCATED MEMORY SPACE OF A PROCESS USING A VIRTUAL MEMORY AREA;

(B) U.S. Ser. No. 08/938,204, filed Sep. 26, 1997, by inventor Scott Elliott, which application later issued as U.S. Pat. No. 6,009,258, entitled METHODS AND DEVICES FOR UNWINDING STACK OF FROZEN PROGRAM AND FOR RESTARTING THE PROGRAM FROM UNWOUND STATE; and (C) U.S. Ser. No. 09/438,706, filed concurrently herewith, by inventor Scott Elliott and Jeff Carr, and originally entitled METHODS FOR AUTOMATICALLY LOCATING DATA-CONTAINING WINDOWS IN FROZEN APPLICATION PROGRAM AND SAVING CONTENTS.

BACKGROUND

1. Field of the Invention

The invention relates generally to computer systems that concurrently execute plural application programs on a preemptive multitasking basis.

The invention is directed more specifically to multitasking systems wherein a given application program may crash and for which it is desirable to limit the ability of a crashed application program to permanently alter data. The invention is directed even more specifically to saving data before it is damaged or destroyed by a crashed program.

2. Description of Related Art

Multitasking computer systems allow multiple application programs to execute in overlapping fashion so that it appears to a user that the programs run simultaneously.

Preemptive multitasking systems are those in which an operating system has supervisory control over the concurrently executing programs. The operating system limits the length of time that each given application program has for using system resources such as a CPU (central processing unit) or other data processing means.

Examples of preemptive multitasking operating systems include Microsoft Windows95™, Microsoft Windows98™, and Microsoft Windows NT™, all of which are available from Microsoft Corporation of Redmond, Wash. These operating systems also permit multi-threaded execution of programs. In multi-threaded execution, a program begins executing as a first, main thread and optionally generates ancillary threads that run concurrently and interact with one another through exchanges of semaphores and other methods.

During execution, a given application program may encounter an unexpected problem which halts normal execution either in a main thread or an ancillary thread. Such problems are caused by: (a) a program attempting to access restricted (privileged) or unavailable areas of memory, (b) a program making calls to unavailable system functions or services without the ability to handle such unavailability, (c) a program jumping into a nonsense stream of execution code, (d) a program invoking a no-time-out wait for an event that never occurs, (e) a program entering into a deadlock embrace, and so forth. This is a nonexhaustive list of possible causes.

When such execution-halting events occur, artisans sometimes refer to the halted program as being "stuck," "frozen," "crashed," or as having encountered a "fatal error." Different flavors of these terms are sometimes associated to one class of cause as opposed to another. In this application, "crashed program" will be generically applied to any and all situations in which a program encounters an unexpected problem halting normal execution, irrespective of the exact cause and irrespective of whether the unexpected halt is permanent.

The user (e.g., novice user) of a computer system typically does not care what has caused a program to crash. Such a user instead generally recognizes the "crashed" condition as an apparently sudden refusal by the given application program to respond appropriately to keyboard strokes, mouse clicks, or other user interface interactions such as voice commands or hand gestures. The user may also be notified by the operating system that a crash has occurred.

The presence of a crashed program does not generally pose a major problem to the overall operations of a preemptive multitasking system. In such systems, other concurrently-executing application programs can continue to run in normal fashion even though a given application has actually crashed (as opposed to situations where the program is fine and the user merely believes it has crashed). The user continues to have access to operating system services and to the resources of other non-crashed application programs running on the computer. For example, in a Windows95/98™ environment the user may hit the Alt-Tab key combination to switch to another task. The user may choose to simply end the tasking of the crashed program and thereafter restart the program afresh from its basic start-up state.

Sometimes, this close-and-restart-afresh option is not an attractive one for the user. The user may have failed (or the user may merely believe that the user has failed) to save a segment of work performed with the crashed program to nonvolatile memory (e.g., to hard disk) before the crash occurred. Closing-and-restarting the crashed program afresh may mean that the unsaved work will be lost forever. Many hours of work may have to be painfully redone to reconstruct the state of the program just before it crashed. In some instances, the pre-crash state of the application may represent non-replicatable work product such as data that had just been captured and/or transformed in real-time.

To remedy this predicament, various unfreezing techniques have been developed. These techniques attempt to revive the crashed program at least to a sufficient level such that unsaved work product may be accessed and saved either wholly or partially. Examples of such unfreezing techniques include those disclosed in the above-cited patents and patent applications.

No currently known revival technique is one hundred percent effective for all possible forms of application programs. One may make an analogy to attempts to revive a human patient by CPR (cardio-pulmonary resuscitation) after the patient suffers a cardiac arrest. In some cases, the patient is fully revived. In other cases, the patient is revived but still suffers from serious complications. And in yet further cases, even heroic attempts to revive the patient regretfully prove unsuccessful. In so far as reviving a crashed application program is concerned, the end goal is not to keep the application program alive and working as long as possible, but rather to keep it alive long enough so that vital, but still unsaved, work product can be saved.

Various "unfreezing programs" are known in the prior art to monitor the execution of applications running on a computer and detect possible crashes of those applications. When a crash is detected, various unfreezing techniques are employed by such unfreezing programs to return crashed programs to at least partial, or full operation. One such commercially available unfreezing program is Crash-Guard™ available from Symantec Corporation of Cupertino, Calif.

After an unfreezing program attempts to revive a crashed application program, the crashed program may resume operation having complete, limited, or no functionality. In addition, the crashed program may perform operations improperly, despite the appearance of proper functionality. The following discussion refers to a crashed application program subject to an attempted revival by an unfreezing program as a "crashed program", regardless of whether the crashed application program is successfully revived to any extent.

The degree of functionality present in a crashed program is particularly important with respect to data modification, storage, and retrieval. If aspects of a crashed program's user interface are corrupted, then the user may be unable to reliably perform important data manipulation operations. This may prevent the user from saving valuable work product. Alternatively, the data storage functions of the crashed program may not return to their normal pre-crash operation, despite the appearance of a fully functional user interface.

This second situation is particularly dangerous since commands, however initiated, to perform simple data manipulations may inadvertently corrupt or overwrite valuable data due to the abnormal operation of the crashed program. For example, a command to save a newly edited copy of a file may cause the crashed program to overwrite the previous version of the file with erroneous, useless data. Thus, there is a need to protect against data loss caused by the operations of a crashed program revived to less than complete functionality.

As mentioned above, various unfreezing programs exist in the prior art. However, the methods utilized by these prior art programs do not necessarily protect a user's original pre-crash data from damage caused by file changing operations attempted by a crashed program. Such programs merely allow a user to save data after a crash, or employ automatic methods for doing so. Nevertheless, such programs do not prevent potential data corruption caused by faulty operations performed by crashed programs.

Other prior art programs exist which document the changing configuration of a computer hard drive. Such "undo programs" typically log all disk-altering events made to a computer's hard drive. Unfortunately, these prior art programs fail to differentiate between file changes made by a crashed program, and file changes made by any other program. Furthermore, such programs do not operate directly in response to the detection of a crash. Rather, they must be loaded prior to a crash, and consume valuable computational time by indiscriminately logging all file changes or creating backup copies of files regardless of whether a crash has occurred.

Thus, the methods employed by prior art computer programs are insufficient to protect the work of a user who continues to operate a crashed program which has been revived to less than complete functionality. No prior art unfreezing program or undo program merges the concept of detecting a crashed application program with the separate concept of backing up only file system changes made by a crashed application program. Furthermore, no prior art program provides these features with the additional benefit of backing up only a select subset of file system changes made by a crashed program.

SUMMARY OF THE INVENTION

The present invention provides methods and systems for saving data potentially modified by a crashed computer program executing in a preemptive multitasking operating system environment. The invention satisfies the long-felt need to efficiently protect against data corruption caused by crashed programs running in such environments.

A method in accordance with the present invention is invoked by an unfreezing program upon the detection of a crashed program. The invention intercedes when a crashed program attempts to perform an operation that could potentially damage or destroy previously stored data. A backup copy of the data is created before allowing the crashed program to act upon the data.

A method in accordance with the invention comprises the steps of: (a) monitoring operating system calls made by a crashed program; (b) intercepting a selected group of operating system calls made by a crashed program before they are executed by an operating system; (c) logging a subset of the selected group of intercepted operating system calls in a memory; (d) creating backup copies of data potentially modified by a further subset of the selected group of intercepted operating system calls; and (e) passing intercepted operating system calls to an operating system.

Other features and aspects of the invention will become apparent from the below detailed description.

BRIEF DESCRIPTION OF THE DRAWINGS

The below detailed description makes reference to the accompanying drawings, in which.

DETAILED DESCRIPTION

Figure 1:
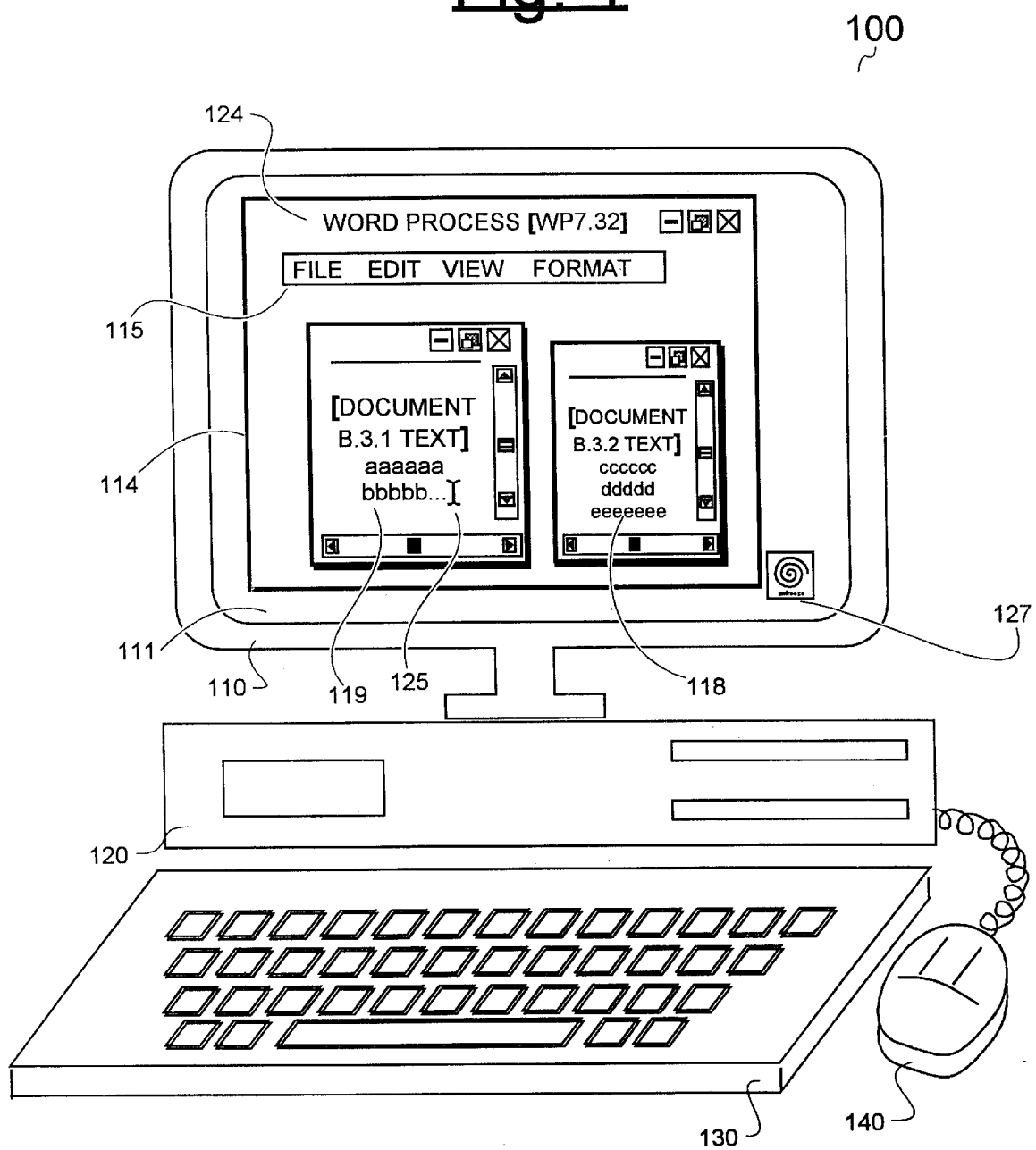
FIG. 1 is a perspective view showing a computer system that may be configured to operate in accordance with the invention.

FIG. 1 illustrates a perspective view of an overall computer system 100 that may be programmably configured to operate in accordance with the invention. The illustrated computer system includes a display monitor 110, a computer housing 120, a keyboard 130, and a mouse 140. The illustrated user input and output devices 110, 130, and 140 are merely examples. Other to-user output devices and from-user input devices may, of course, be used in addition to or in place of the illustrated devices. Mouse 140 for example can be replaced by or supplemented with other graphically-oriented user input devices such as trackballs, touch pads, joysticks, and so forth. Voice input and/or output interfaces are contemplated in addition to the illustrated visual and tactile interfaces.

Display monitor 110 includes a display screen 111 that can display a number of graphical items including a desktop layer and an overlying, opened application window 114. (Reference numbers that are braced by dashes are not part of what is displayed on screen 111.) In the illustrated example, the opened application window 114 contains information belonging to a running word processing program 124, where the latter program 124 has the fictional name, WORD PROCESS. The actual word processing program could be Microsoft WORD™, Corel WordPerfect™, or any one of a host of other commercially available word processing programs. For purposes of this discussion, it will be assumed to be WordPerfect™ version 7.x. The application window 114 could alternatively have contained a spreadsheet program (e.g., Microsoft EXCEL™), a picture-drawing program (e.g., Adobe Illustrator™), an Internet browser program (e.g., Microsoft Explorer™), an electronic mailing program (e.g., Qualcomm Eudora™), or any other such application program. The example of a word processing program is used here because many computer users are at least familiar with this type of application program.

Application window 114 normally appears as being continuously filled with other items such as vertical and horizontal scroll bars, ruler bars, tool bars (not all shown), and a top menu bar 115. The top or main menu bar will typically have menu-dropping areas such as FILE, EDIT, VIEW, FORMAT, etc. This is common, for example, in programs running under Microsoft Windows98™ or Microsoft NT™.

In addition to word processing program 124 shown on display screen 111, an unfreezing program is also running on the computer. Depending on the configuration enabled by the user, the unfreezing program may appear as an icon 127, a separate window (not shown), or may not appear on display screen 111 at all (not shown). In FIG. 1, the unfreezing program is running in the background, waiting to detect a crash by word processing program 124 or any other application program.

Figure 2:
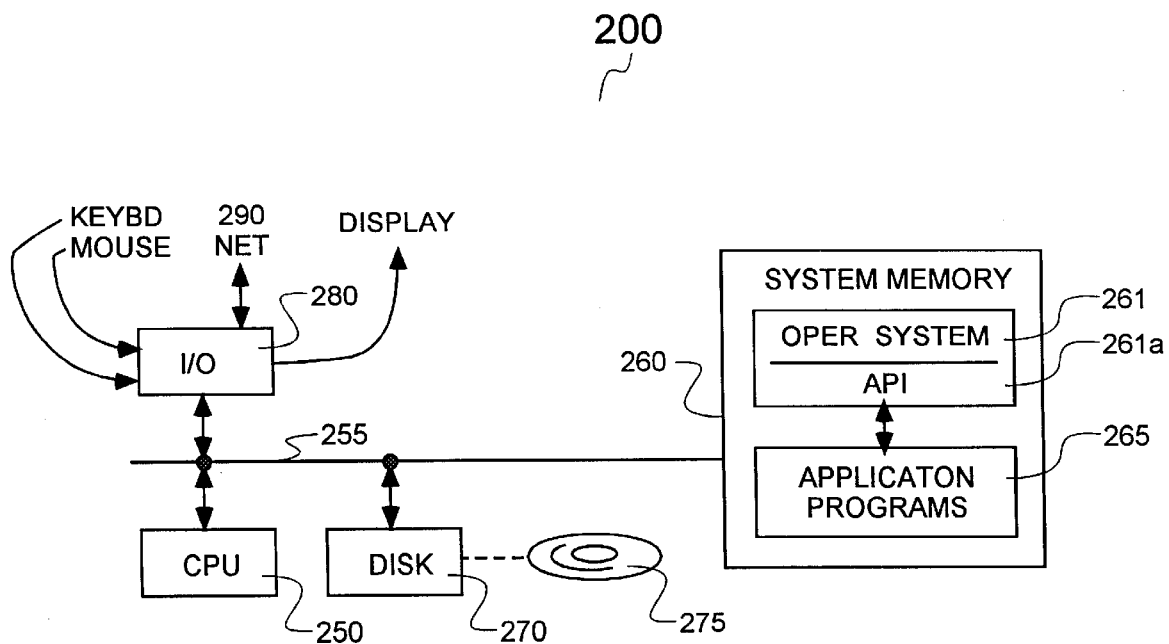
FIG. 2 is a block diagram of a computer system that may be configured to operate in accordance with the invention.

Referring now to FIG. 2, a possible method for interconnecting components of a computer system 200 configured to operate in accordance with the invention is shown schematically. Computer system 200 may include a CPU 250 or other data processing means (e.g., plural processors), and a system memory 260 for storing immediately-executable instructions and immediately-accessible data for the CPU 250 or other processors. System memory 260 typically takes the form of DRAM (dynamic random access memory) and cache SRAM (static random access memory). Other forms of such high-speed memory may also be used. A system bus 255 operatively interconnects the CPU 250 and system memory 260.

Computer system 200 may further include non-volatile mass storage means 270 such as a magnetic hard disk drive, a floppy drive, a CD-ROM drive, a re-writeable optical drive, or the like that is operatively coupled to the system bus 255 for transferring instructions and/or data over bus 255. Instructions for execution by the CPU 250 may be introduced into computer system 200 by way of computer-readable media 275 such as a floppy diskette, a CD-ROM optical platter, or other like instructing devices adapted for operatively coupling to, and providing instructions and data for the CPU 250 (or an equivalent instructable machine). The computer-readable media 275 may define a device for coupling to, and causing computer system 200 to perform operations in accordance with the present invention as further described herein.

Computer system 200 may further include I/O (input/output) means 280 for providing interfacing between system bus 255 and peripheral devices such as display 110, keyboard 130 and mouse 140. The I/O means 280 may further provide interfacing to a communications network 290 such as an Ethernet network, a SCSI network, a telephone network, a cable system, or the like. Instructions for execution by the CPU 250 may be introduced into computer system 200 by way of data signals transferred over communications network 290. Communications network 290 may therefore define a means for coupling to, and causing computer system 200 to perform operations in accordance with the present invention. The instructing signals that are transferred through the communications network 290 for causing computer system 200 to perform said operations may also be manufactured in accordance with the present invention.

System memory 260 holds executing portions 261 of the operating system and of any then-executing parts of application programs 265. The application programs 265 generally communicate with the operating system by way of an API (application programming interface) 261a. One of the operations that is routinely carried out, is the passing of object-oriented messages from one window object (not shown in FIG. 2) to another such object within system memory 260. Often the operating system 261 will act as an intermediate carrier of such messages. System memory 260 may include memory means for causing computer system 200 to perform various operations in accordance with the present invention as further described herein.

Figure 3:
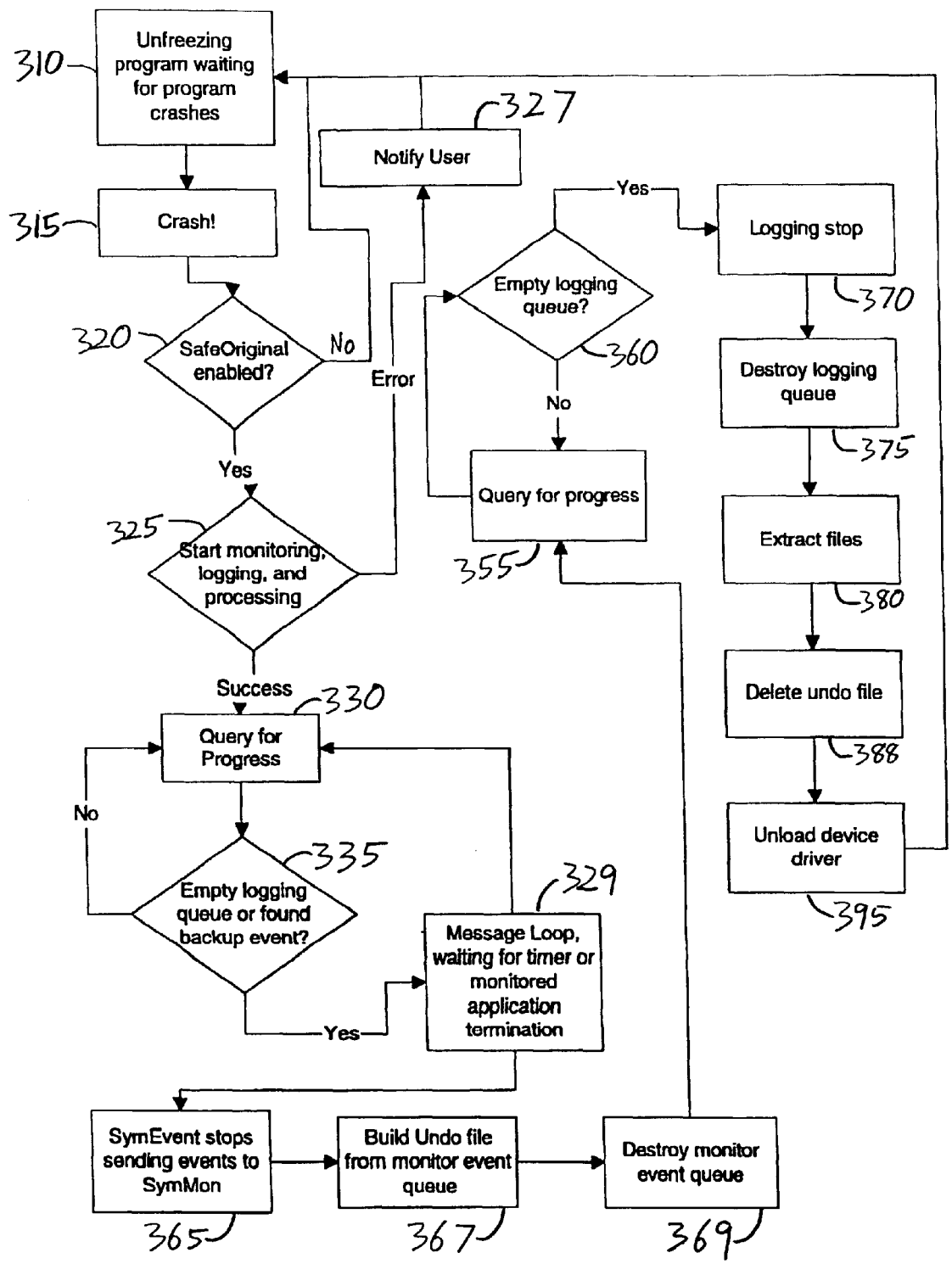
FIG. 3 is a flow diagram representing the steps used by an unfreezing program to monitor, log, and process operating system calls made by a crashed program in accordance with the invention.

FIG. 3 provides a backup method flowchart 300 detailing the steps performed in one embodiment of the present invention to create backup copies of data potentially modified by a crashed program. Although flowchart 300 illustrates a method comprised of sequential steps, persons skilled in the art will appreciate that the CPU switches to executing other programs between steps or during steps. In the embodiment provided in FIG. 3, an unfreezing program (e.g., Symantec CrashGuard™ 4.0) contains instructions to perform the steps of the backup method illustrated in flowchart 300.

The unfreezing program runs on a computer utilizing a preemptive multitasking operating system environment. In step 310, the unfreezing program watches the execution of application programs running on the computer, waiting for those application programs to crash. If the unfreezing program detects a behavior or lack of behavior in an application program that it perceives as a crash, it will assume a crash has occurred and proceed to step 315. In step 315, the unfreezing program notes the crash and considers the application program a crashed program.

The unfreezing program then proceeds to step 320 where it queries the operating system registry to determine whether the backup method illustrated in flowchart 300 has been disabled by the user. If the backup method has been disabled, then the unfreezing program returns to its other operations such as attempting to revive the crashed program, detecting further application crashes, archiving data presently in volatile memory, and other tasks not relevant to the present invention. This return to other operations is indicated in FIG. 3 as the path connecting step 320 immediately back to step 310. On the other hand, if the backup method is enabled, then the unfreezing program proceeds to step 325.

In another embodiment of the present invention, the unfreezing program queries the user at the time a crash is detected (not shown) rather than the registry. In such an embodiment, the user elects to enable or disable the backup method at the time a crash is detected.

The unfreezing program continues to carry out the backup method illustrated in flowchart 300 (if enabled) regardless of whether a first revival attempt by the unfreezing program is successful. However, the backup method will terminate if an error is detected during the operations initiated at step 325, described below.

Upon reaching step 325, the unfreezing program allocates memory for a monitor event queue, a logging queue, and a copy buffer (not shown). Following these preliminary actions, the unfreezing program begins monitoring, logging, and processing calls to the operating system made by programs running on the computer. This is accomplished through a first ring0 device driver ("SymEvent") and a second ring0 device driver ("SymMon"). "Statically loaded" device drivers are loaded at the time an operating system is loaded, and cannot be unloaded without unloading the operating system. "Dynamically loaded" device drivers are loaded at a time after an operating system is loaded, and may be unloaded and reloaded without unloading the operating system. SymEvent is statically loaded when used in the Microsoft Windows95™ and Microsoft Windows98™ operating system environments, but dynamically loaded when used in the Microsoft Windows NT™ operating system environment. In contrast, SymMon is dynamically loaded when used in all three operating system environments. The unfreezing program initializes both device drivers at step 325.

Figure 4:
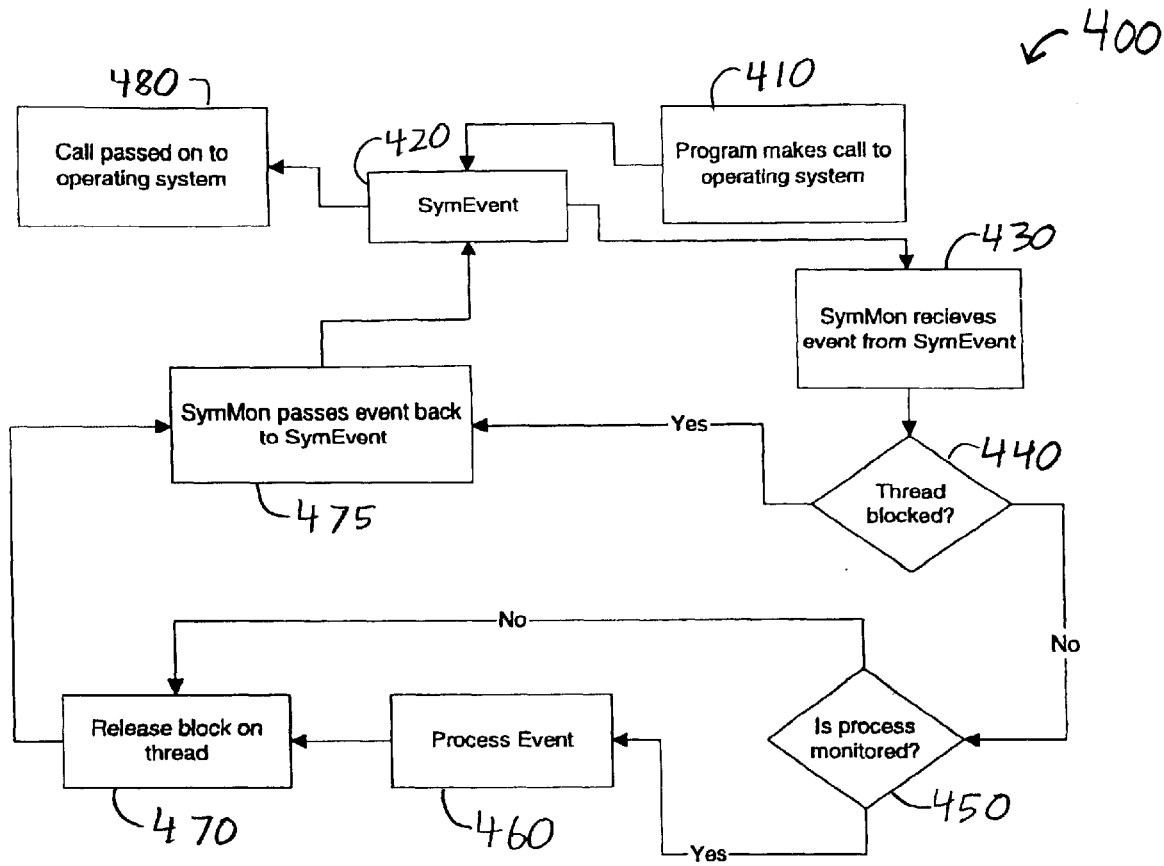
FIG. 4 is a flow diagram representing the steps used by two device drivers to implement the monitoring, logging, and processing of operating system calls made by a crashed program in accordance with the invention.
Figure 5:
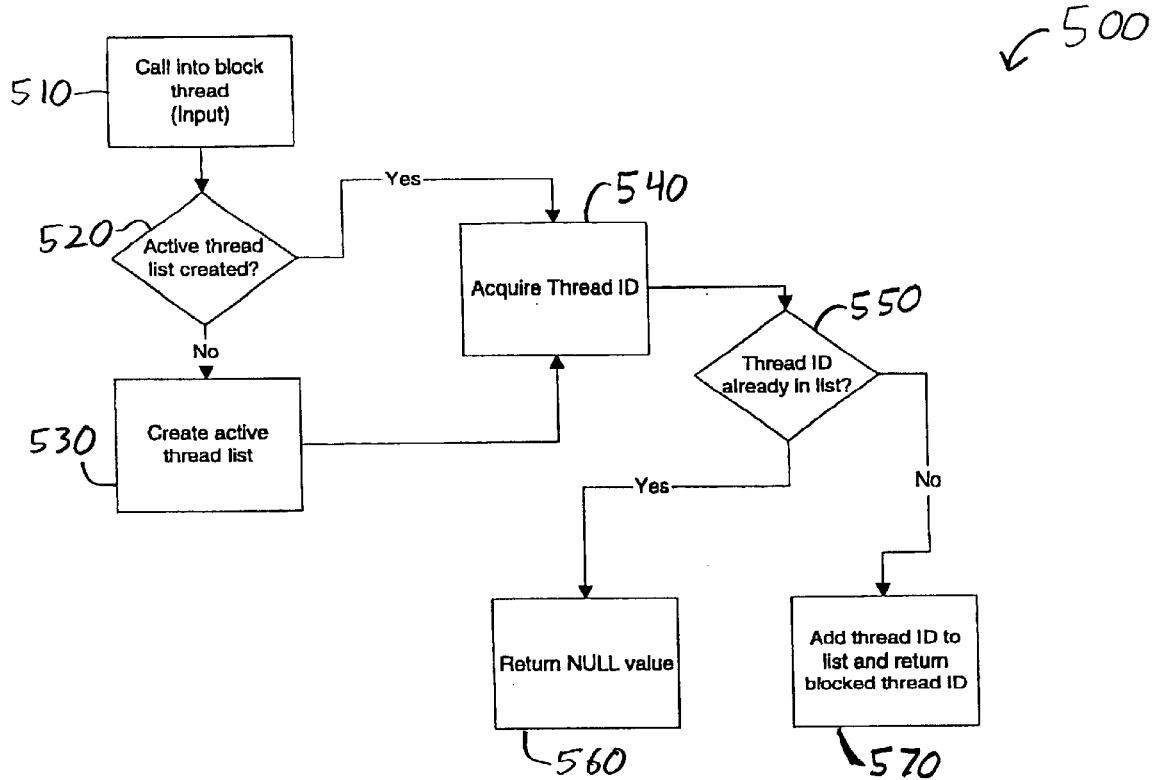
FIG. 5 is a flow diagram representing the steps used by a thread blocking function employed by a device driver in accordance with the invention.
Figure 6:
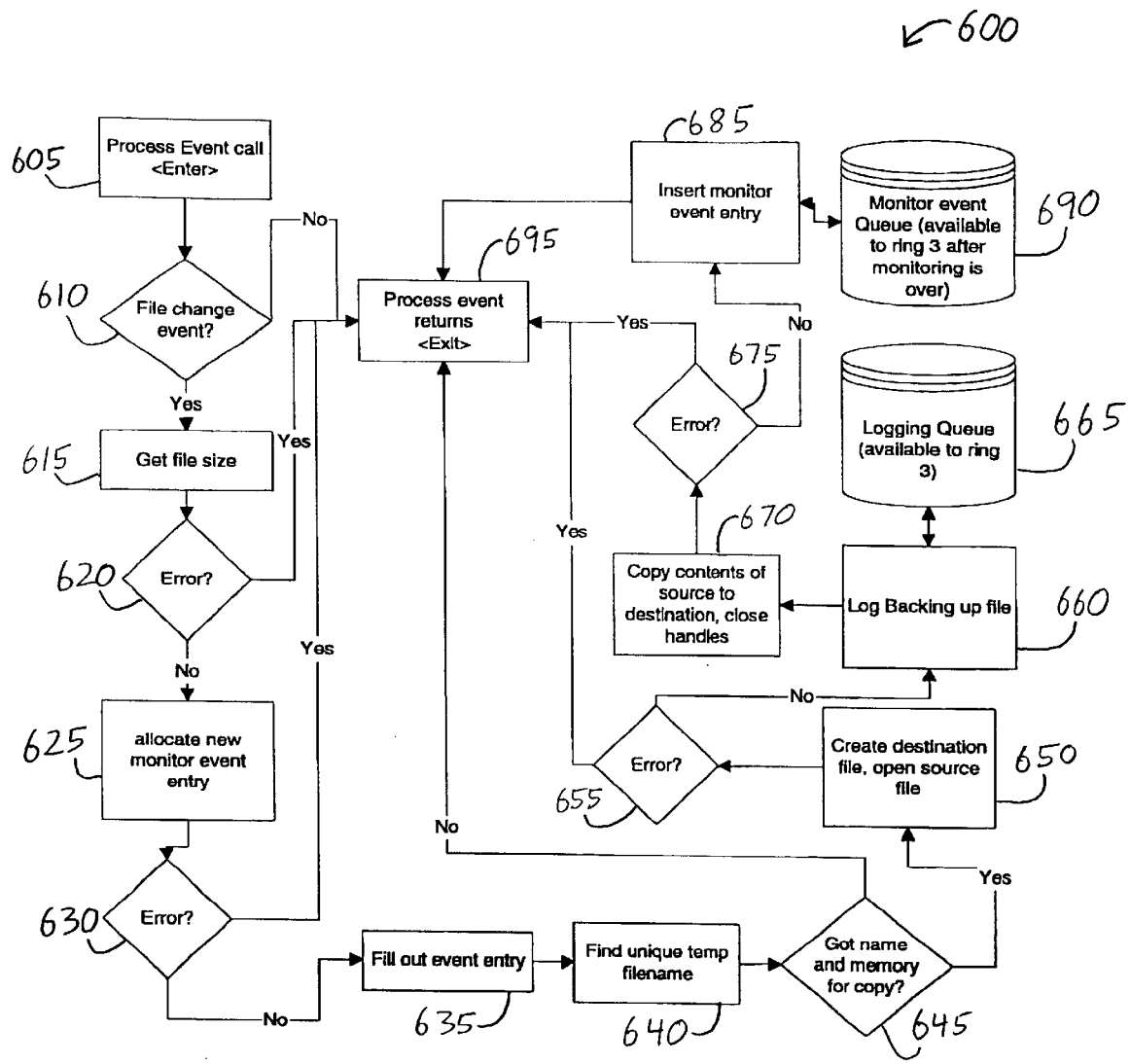
FIG. 6 is a flow diagram representing the steps used by a process event function employed by a device driver in accordance with the invention.

FIGS. 4, 5, and 6 illustrate how SymEvent and SymMon monitor, log, and process calls made by programs running on the computer.

Referring to FIG. 4, an event tracking method flowchart 400 is provided. This flowchart illustrates the event tracking method used by SymEvent and SymMon to monitor operating system calls. When a program running on the computer makes a call to the operating system 410, the call is intercepted by SymEvent 420. This is achieved through a subclassing scheme (hooking) disclosed in U.S. Pat. No. 5,812,848 issued Sep. 22, 1998 to Leonardo Cohen entitled, "Subclassing system for computer that operates with portable-executable (PE) modules."

After intercepting the call to the operating system, SymEvent passes a packet of information ("current event") describing the intercepted call to SymMon 430. Although the current event is generated by SymEvent in response to a call to the operating system made by the crashed application running on a specific computer, it is contemplated that the current event may relate to changes made to files stored locally on the computer as well as files stored at remote locations. It is also contemplated that the term "file" as used here should not be limited to include merely data stored in permanent or semi-permanent mediums. For example, calls to the operating system to change data stored in a volatile cache or flash memory are intercepted by SymEvent.

The current event includes the identification number of the thread making the operating system call ("thread ID"), the identification number of the process (application program) which contains the thread making the operating system call ("process ID"), and the identity of the file sought to be modified by the operating system call.

SymMon then checks if the operating system call corresponding to the current event was made by one of the application programs running on the computer rather than the device drivers 430. This is to prevent SymMon from processing operating system calls generated by the device drivers. SymMon performs this check by determining whether the thread ID of the current event has already been blocked 440 from the subsequent SymMon processing step 460. A thread ID will be blocked if a call to a "thread block function" returns a null value. SymMon calls a thread block function in step 440.

Referring to FIG. 5, a thread block function flowchart 500 is provided, illustrating the steps in one embodiment of the present invention to determine which thread generated the operating system call. Step 510 shows the entry point where SymMon calls the thread block function. The function checks if an active thread list exists in memory 520. An "active thread list" is a linked list which contains the thread ID's of any events that have been passed to SymMon by SymEvent, but have not been completely processed by SymMon or passed back to SymEvent. (SymMon event processing is described in further detail below.) If an active thread list is found, then SymMon proceeds to step 540. If no list is found, then SymMon creates the active thread list in memory 530 and continues to step 540.

Upon reaching step 540, SymMon acquires the thread ID corresponding to the current event by calling the operating system. This is possible since SymMon is operating in the same thread context as the thread which originated the call corresponding to the current event. SymMon then checks the active thread list to determine whether the thread ID of the current event is contained in the active thread list 550. If the thread ID is found in the active thread list, the thread block function ends, and a null value is returned 560. If the thread ID of the current event is not found in the active thread list, then the thread ID of the current event is inserted into the active thread list 570. The thread block function then ends, returning the thread ID of the current event 570.

Referring again to FIG. 4, if a null value is returned from the thread block function, SymMon assumes that the current event does not correspond to an operating system call made by the crashed program. As a result, the thread which generated the call corresponding to the current event is "blocked" from the SymMon processing step 460. In such a case, SymMon passes the current event back to SymEvent 475. SymEvent 420, in turn, passes the call corresponding to the current event on to the operating system 480.

On the other hand, if a null value is not returned from the thread block function called in step 440, SymMon proceeds to step 450 where it determines whether the process ID contained in the current event corresponds to a process running on the computer that SymMon seeks to monitor. SymMon makes this determination by checking to see if the process ID contained in the current event corresponds to the process ID of the crashed program. SymMon obtains the process ID of the current event by requesting it from the operating system. If the process ID's do not match, then the process corresponding to the process ID of the current event is not a process that SymMon seeks to monitor. As a result, SymMon proceeds to step 470 to release the block on the thread. SymMon achieves this by removing the thread ID of the current event from the active thread list. SymMon searches for the thread ID of the current event on the active thread list. When the thread ID is found, SymMon releases the entry in the active thread list containing the desired thread ID. After completing this step, SymMon passes the current event back to SymEvent 475. SymEvent 420, in turn, passes the call corresponding to the current event on to the operating system 480.

However, if step 450 reveals that the process ID's of the current event and the crashed program do match, SymMon will know that the current event originated from the crashed program. As a result, SymMon will process the current event by calling a process event function 460.

FIG. 6 provides a process event function flowchart 600 which illustrates the steps in a process event function called by SymMon. The process event function begins with a function call 605 by SymMon. The function first determines whether the current event is one of several types which are desirable to process 610. Although SymEvent intercepts many calls to the operating system and passes corresponding events to SymMon, only events corresponding to calls made by the crashed program are sought to be processed in the backup method. Furthermore, not all operating system calls generated by the crashed program pertain to potentially damaging or destructive data manipulations. Thus, SymMon chooses to process only events generated by SymEvent in response to operating system calls which: rename objects, write to files, open files for writing, create files, or delete files. For purposes of this discussion, these events are collectively referred to as "file changing events." Therefore, SymMon filters out all events except for file changing events 610. If the current event is a file changing event, then the process event function proceeds to step 615. Otherwise, the function returns with no further event processing 695.

At step 615, the process event function knows that the current event will be acting on a file since it was found to be a file changing event. In addition, it is clear from step 450 of the event tracking method that the current event corresponds to an operating system call made by a crashed program. In accordance with the backup method of the present invention, SymMon intends to create a backup copy ("backup data") of data contained in a source file which will be potentially modified by operating system calls generated by crashed programs. To this end, the process event function obtains the size of the file which will be modified by the call corresponding to the current event 615. If an error is encountered while getting the file size 620, the process event function branches to step 695 where it returns.

Otherwise, the process event function allocates memory for a new entry in the monitor event queue 625. If an error is encountered while allocating this entry 630, the function branches to step 695 where it returns.

If no error is found, the function stores information in the memory allocated for the new entry 635 of the monitor event queue describing the type of file changing operation sought to be performed by the operating system call corresponding to the current event.

Following this step, the process event function finds a unique temporary filename 640 to be assigned to a new temporary file to contain the backup data. After finding the filename, the function checks if the filename is valid and whether there is sufficient memory in the copy buffer (created by the unfreezing program upon reaching step 325) to perform a copy operation 645. If these conditions are not met, the process event function branches to step 695 where it returns.

If both a valid filename and sufficient memory exist, the function creates a destination file to store the backup data and opens the source file 650 which contains the data which will be potentially modified by the operating system call corresponding to the current event. If an error occurs while creating the destination file or opening the source file 655, the function branches to step 695 where it returns. Otherwise, the function adds a "backup event entry" 660 to the logging queue 665 which records the occurrence of a backup operation to be performed by SymMon in step 670.

After logging this entry, SymMon actually performs the backup operation corresponding to the backup event entry created in the logging queue by copying the contents of the source file to the newly created destination file and then closing the handles to both files 670. The destination file ("backup file") now contains the backup data and is located in a temporary directory. In the Microsoft Windows98™, and Microsoft Windows NT™ operating system environments, this backup file is stored in the default temporary directory used by the particular operating system environment. In another embodiment of the present invention, the backup file is stored in a directory specified by the user.

If an error occurs 675 during this backup operation, the function branches to step 695 where it returns. If no error is found, SymMon adds further information to the memory allocated for the new entry 635 of the monitor event queue, describing the backup operation as well as the backup file created by the operation 685. SymMon then inserts the complete entry into the monitor event queue 690. Following this entry, the process event function proceeds to step 695 where it returns.

In another embodiment of the present invention, small amounts of backup data are stored directly in a monitor event queue entry rather than separate destination files. This embodiment is most practical when operating system calls are directed to modify only a small amounts of data, such as changes to the registry. The ability to store backup data directly in the monitor event queue removes the need for a separate backup file when saving small amounts of backup data. This reduces the total number of files created by SymMon. Since the time required to create backup files consumes valuable CPU time allocated for the crashed program, and only a limited number of files may be created on a given storage medium, the ability to store data directly in the monitor event queue results in more efficient operation of the crashed program.

In yet another embodiment, SymMon stores small amounts of backup data in the monitor event queue while storing large amounts of backup data in separate backup files.

Although the monitor event queue, logging queue, and backup files have been described as containing specific types of information, the present invention is not limited to the specific information enumerated above. The present invention contemplates the storage of any additional data in the monitor event queue, logging queue, or backup files which may be desirable to the further execution of the unfreezing program.

Referring again to FIG. 4, when the process event function returns, SymMon proceeds to step 470 where it releases the thread ID of the current event from the active thread list as discussed above. After completing this step, SymMon passes the current event back to SymEvent 475. SymEvent 420, in turn, passes the call corresponding to the current event on to the operating system 480.

The operation of SymEvent and SymMon can be understood by way of example. If the user interface of a crashed program has been sufficiently revived by an unfreezing program, a user may attempt to save a file to hard disk. Alternatively, the crashed program itself may attempt to save a file without any action taken by the user. In response to either attempt, the crashed program issues a call to the operating system to store data to a specific location on a computer writeable medium. Of course, the call to the operating system issued by the crashed program may or may not properly implement the file saving operation intended. This will depend on the level of functionality remaining in the crashed program in its post-crash state. Such a call to the operating system causes SymEvent to generate a file changing event. SymMon receives the file changing event while SymEvent prevents the corresponding call from passing to the operating system. SymMon processes the event by recording the event in the monitor event queue and creates a backup copy of the data potentially modified by the operating system call. SymMon also records an entry in the logging queue describing the event as well as the backup operation performed by SymMon. After SymMon backs up the potentially modified data, and the entries to the logging queue and the monitor event queue are completed, SymMon passes the event back to SymEvent. In response, SymEvent passes the operating system call corresponding to the file changing event on to the operating system.

In another embodiment of the present invention, SymMon instructs SymEvent to ignore a select group of calls to the operating system. In such an embodiment, a call in the select group of calls is not passed on to the operating system as described in the embodiment above. Rather, the call is discarded, and the crashed program which issued the call receives a success code as if the call was successfully carried out.

In yet another embodiment of the present invention, SymMon instructs SymEvent to modify a select group of calls to the operating system to perform different operations than the operations specified by the original call made by the crashed program. This embodiment provides an alternative to merely discarding a select group of calls as in the embodiment immediately above.

In still another embodiment of the present invention, SymMon instructs SymEvent to pass on, modify, and discard different operating system calls made by a crashed program. Thus, the various operating system calls made by a crashed program are handled differently by SymEvent, depending on the operation contained in the call.

Referring again to FIG. 3, if an error occurs at any point during the monitoring, logging, and processing operations begun at step 325 (such as insufficient disk space, insufficient memory, invalid memory addresses, or damage to the operating system disk writing subsystem), then the unfreezing program notifies the user of the error 327 and return to step 310 where it resumes waiting for applications to crash.

After starting the monitoring, logging, and processing operations described above, the unfreezing program starts a timer controlled by the operating system whereby a timing message is sent to the unfreezing program's message queue at specified intervals. In one embodiment of the present invention, the timer interval is fixed at 250 milliseconds. The unfreezing program then proceeds to step 330.

At step 330, the unfreezing program queries SymMon as to whether there are any entries in the logging queue. SymMon responds to this query in step 335 by checking the contents of the logging queue. If at least one entry is found in the logging queue, then SymMon "pulls" this entry from the logging queue and passes it to the unfreezing program. Since the entry is pulled from the queue, the entry will be deleted from the queue. If the entry pulled from the logging queue is a backup event entry, then the unfreezing program displays the event in the user interface and proceeds to step 329. However, if the entry pulled from the logging queue is not a backup event entry, then the unfreezing program discards the pulled event and loops back to step 330 where another query is made to SymMon. When no entries are found in the logging queue (e.g., the logging queue is empty) 335, the unfreezing program proceeds to step 329.

At step 329, the unfreezing program enters a message loop where it waits to loop back to step 330. The unfreezing program does not loop back to step 330 until it receives a timing message from the operating system triggered by the timer started above. While waiting for the next timing message from the operating system, the unfreezing program may detect that the crashed application has terminated. In this case, the unfreezing program proceeds to step 365 discussed below. Otherwise, the unfreezing program returns to step 330 upon receiving a timing message.

At step 365, the unfreezing program instructs SymEvent to stop passing events to SymMon 365. Thus, the device drivers no longer perform the monitoring operation started at step 325.

Figure 7:
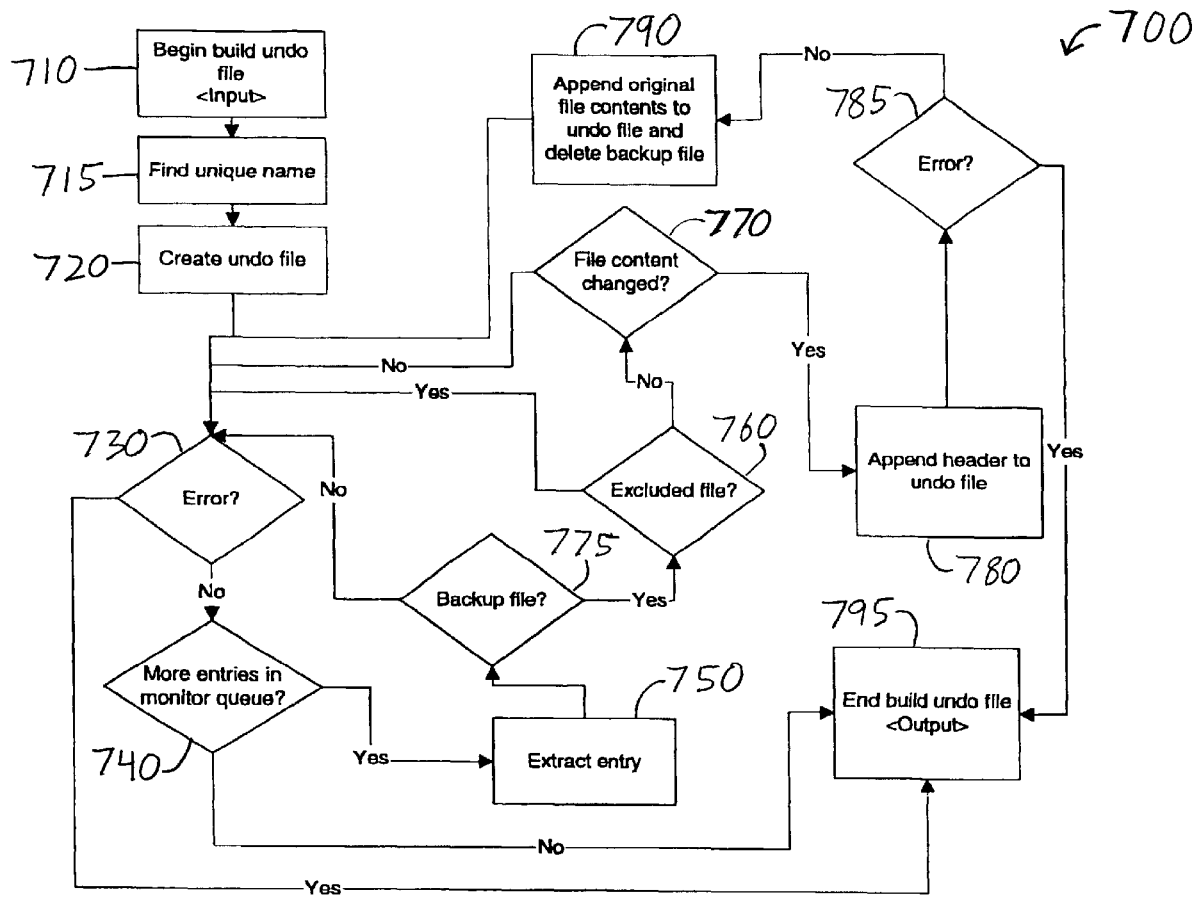
FIG. 7 is a flow diagram representing the steps used by a process to build an undo file in accordance with the invention.

The unfreezing program then builds an "undo file" 367 using entries in the monitor event queue and backup files created by the process event function. This is accomplished through a build undo file process utilized by the unfreezing program 367. Referring to FIG. 7, a build undo file process flowchart 700 is provided. After the build undo file process begins 710, a unique filename is found for the undo file 715. The operating system is then called to create the undo file using the unique filename 720. If the operating system is unable to properly create the new file, this will be detected as an error 730. Upon detecting an error, the build undo file process ends 795.

If the undo file is successfully created, the process checks whether any entries are contained in the monitor event queue 740. If no entries are found, then the build undo file process ends 795. However, if the monitor event queue contains at least one entry, then the entry is extracted 750 and analyzed to determine whether it references a backup file 755. As discussed above, entries in the monitor event queue created by the process event function may refer to backup files created by the process event function. However, the monitor event queue may contain other entries not relevant to the present invention which do not reference a backup file. If the extracted entry does not reference a backup file, then it is discarded, and the process returns to step 730. On the other hand, if the extracted entry references a backup file, then the process proceeds to step 760.

At step 760, the process analyzes the extracted entry to determine whether it references an excluded file 760. An "excluded file" is a backup file created in response to an operating system call which the unfreezing program or user has deemed unimportant. Such calls include, but are not limited to: changes to the operating system swap file, changes to temporary files or directories, changes to files or subdirectories contained in specific file directories, calls which result from specified operations which are undesirable to backup (such as updates to a file listing recently used files), or specific files found in a list of files to be filtered. If the extracted entry references an excluded file, then the entry is discarded, and the process returns to step 730. Otherwise, the process proceeds to step 770.

At step 770, the build undo file process determines whether the contents of the backup file referenced by the extracted entry differs from the original file which was backed up. This allows the process to identify any unnecessary backup files. For example, when a file is re-saved to disk, the process event function creates a backup file in response to this action. This backup file will be created, even if the file was never modified. Step 770 allows the unfreezing program to discard such unnecessary backup files and thus reduce the size of the undo file. If the contents of the backup file matches the original file, then the process loops back to step 730, discarding the extracted entry and backup file. If the files do not match, then the process appends header information to the undo file 780, indicating a new entry in the undo file (created in step 720). If the process encounters an error while appending the header 785, the build undo file process will end 795. Otherwise, the process appends the contents of the backup file to the undo file 790 and loops back to step 730.

The build undo file process continues until all entries in the monitor event queue have been extracted. At the end of this process 795, the undo file holds the contents of all backup files which were not discarded.

Referring again to FIG. 3, the unfreezing program destroys the monitor event queue 369 after building the undo file 367. The unfreezing program then enters a post-processing loop formed by steps 355 and 360. Steps 355 and 360 together perform a final purge of the logging queue. Although the logging queue may have been empty (e.g., all entries were extracted) when the unfreezing program moved from step 335 to step 329, SymMon may have intercepted new events called by the crashed program during the time elapsing between the previous query and the termination of the crashed program. As a result, the logging queue may contain additional entries that were not present during the previous query of step 330.

In step 355, the unfreezing program again queries SymMon to determine whether any entries are present in the logging queue. If no entries are found 360, then the unfreezing program proceeds to step 370. If an entry is found, SymMon pulls the entry from the queue and passes it to the unfreezing program. If the pulled entry is a backup event entry, then the unfreezing program displays the event in the user interface. If the pulled entry is not a backup event entry, then it is discarded.

In one embodiment of the present invention, the unfreezing program loops back to step 355 after pulling an entry from the logging queue. In this case, the unfreezing program continues to loop between steps 355 and 360 until all entries have been pulled from the queue. When the last entry is pulled from the queue, the unfreezing program makes a final query to SymMon in step 355. When SymMon finds no additional entries in the logging queue 360, the unfreezing program proceeds to step 370.

In another embodiment of the present invention, the unfreezing program only loops back to step 355 if less than ten backup event entries have been pulled from the logging queue during steps 355 and 360. When a tenth backup event entry is pulled from the logging queue, then the unfreezing program displays the backup event entry in the user interface and proceeds to step 370, even if additional entries remain in the logging queue.

At step 370, the unfreezing program instructs SymMon to stop entering events into the logging queue 370. Following this, the unfreezing program destroys the logging queue 375.

Figure 8:
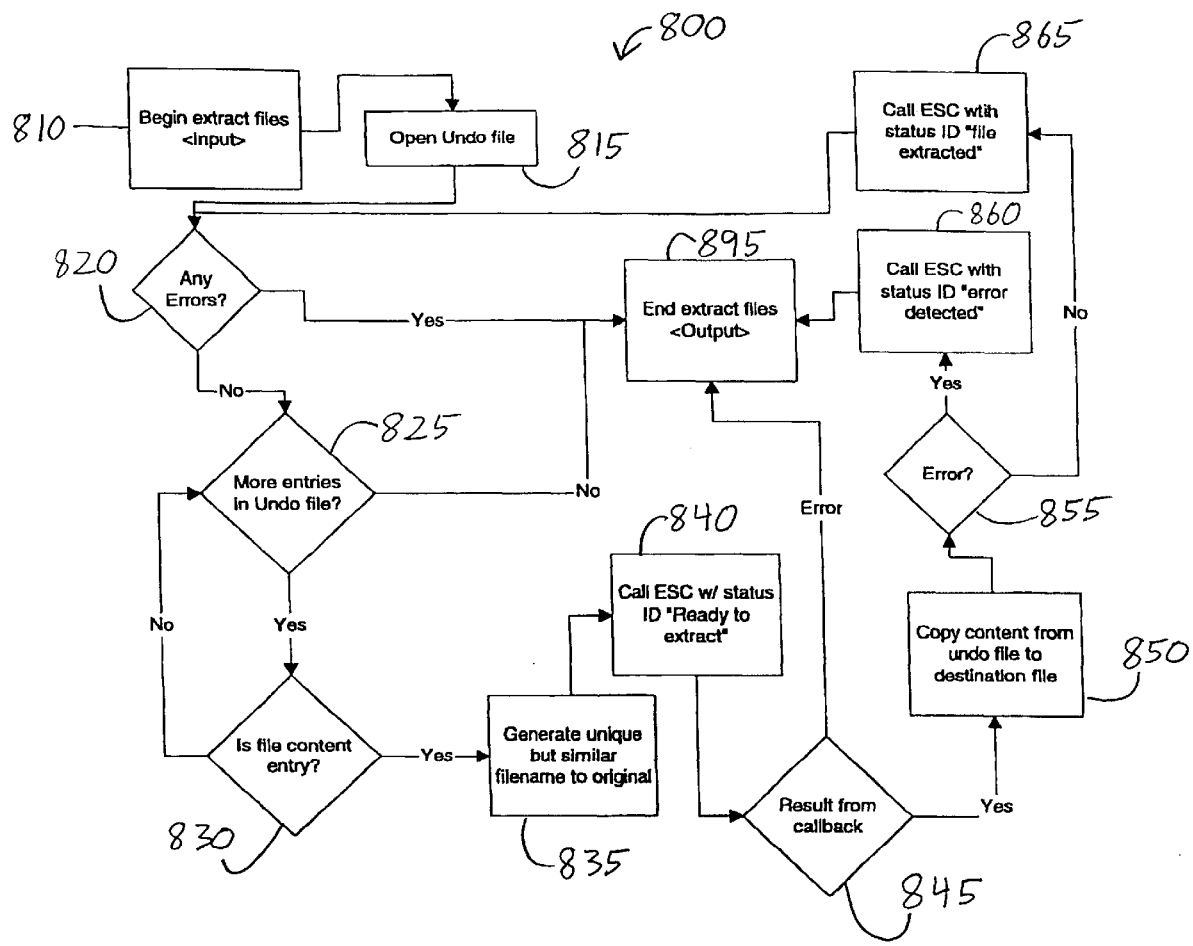
FIG. 8 is a flow diagram representing the steps used by an extract files function in accordance with the invention.

The unfreezing program then calls an extract files function 380 which extracts the backup data added to the undo file in step 367 into separate files. FIG. 8 provides an extract files function flowchart 800 which illustrates the steps in the extract files function. Referring to FIG. 8, the extract files function begins with a function call 810 by SymMon. The function opens the undo file 815 which was created by the build undo file process. If the extract files function encounters errors when attempting to open the undo file 820, the function ends 895. Otherwise, the extract files function looks for any entries contained in the undo file 825. As discussed above, these entries are identified by the header appended in step 780 of the build undo file process. If no entries are found, then the function ends 895. If at least one entry is found in the undo file ("the current undo file entry"), then the function proceeds to step 830.

The extract files function next determines whether the current undo file entry includes data collected from a backup file (file content) 830. Entries in the undo file may hold information other than the actual contents of backup files. Such information includes descriptions of file attribute changes, directory changes, registry changes, and other information not relevant to the present invention. Step 830 prevents the extract files function from attempting to extract such non-file content into a file. If the current undo file entry does not contain data appended from a backup file (file content), then the entry is ignored, and the extract files function loops back to step 825. Otherwise, the extract files function proceeds to step 835. At step 835, the extract files function generates a unique filename similar to the filename of the backup file that contained the backup data appended to the current undo file entry in step 790 of the build undo file process. This unique filename will be assigned to a new backup file created in step 850, containing the backup data appended to the current undo file entry.

Figure 9:
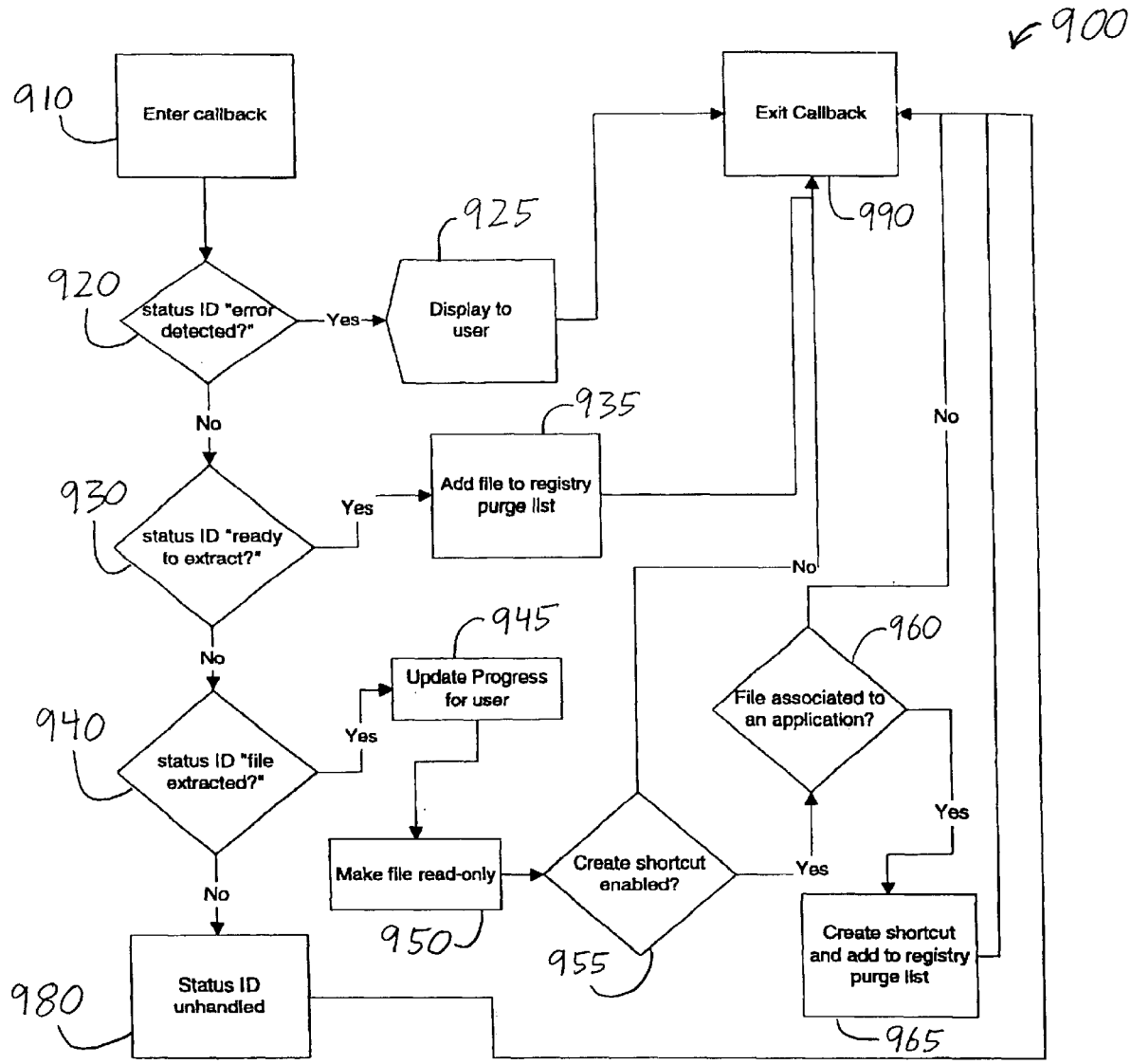
FIG. 9 is a flow diagram representing the steps used by an extraction status callback in accordance with the invention.

The extract files function then calls an extraction status callback 840. Referring to FIG. 9, an extraction status callback flowchart 900 is provided, illustrating the steps taken by the extraction status callback. The extraction status callback performs different operations, depending on the progress of the extract files function through the extract files function flowchart 800 as indicated by a status identification code ("status ID") passed to the extraction status callback. The extraction status callback operates in response to three different status ID's: "ready to extract," "file extracted," and "error detected." Any status ID not corresponding to one of these three possible codes is considered "unhandled" and will not be acted upon.

When the extract files function calls into the extraction status callback 910 from step 840, it passes the unique filename obtained in step 835 as well as a "ready to extract" status ID indicating that the extract files function seeks to extract the backup file data contained in the current undo file entry. The extraction status callback then checks the status ID passed by the unfreezing program 920. If the "error detected" status ID was passed, then the error is displayed to the user in step 925 and the extraction status callback will exit. Since the status ID passed by the extract files function in step 840 is not an "error detected" status ID 920, the extraction status callback proceeds to step 930.

The extraction status callback then checks if the status ID passed by the unfreezing program indicates it is "ready to extract" 930. Indeed, this is the status ID passed into the extraction status callback from step 840 of the extract files function. As a result, the extraction status callback enters the unique filename passed by the extract files function into the registry 935. This allows the unfreezing program to identify the new backup file (created below in step 850) if the unfreezing program or the user wish to purge the new backup file at a later time. After the new backup file is noted in the registry, the extraction status callback calls back to the unfreezing program.

Referring again to FIG. 8, the extraction status callback calls back to the extract files function indicating whether the registry entry of step 935 was successfully entered 845. If the entry was unsuccessful, then the extract files function ends 845. Otherwise, the extract files function creates a new backup file with the unique filename generated in step 835 and then copies the backup data contained in the current entry into the new backup file 850. If the extract files function encounters any errors 855 in this step, it calls the extraction status callback, passing the unique filename and an "error detected" status ID 860.

Referring to FIG. 9, the extraction status callback receives the status ID 910 and then checks to see whether it indicates an error 920. Since step 860 passes an "error detected" status ID, the extraction status callback displays the error to the user 925, and exits 990. The extract files function will then end 895.

If no errors were detected during copying step 850, the extract files function calls the extraction status callback, passing the unique filename as well as a "file extracted" status ID indicating that the backup data contained in the current entry in the undo file was successfully extracted into a new backup file 865. Upon receiving the unique filename and status ID 910, the extraction status callback again checks if the status ID passed by the unfreezing program indicates that an error has been detected 920 or the program is ready to extract backup files from the undo file 930. Since a "file extracted" status ID was passed 865, the extraction status callback proceeds to step 940.

If the status ID does not correspond to the code for the completion of a file extraction, then the status ID will be unhandled 908 whereby the extraction status callback proceeds to step 990 and calls back to the unfreezing program.

However, since the status ID passed from step 865 indicates the completion of a file extraction, the extraction status callback proceeds to step 945 where it communicates to the user that a new backup file has been extracted and stored. After passing this information, the extraction status callback changes the attribute of the new backup file to a "read only" state in step 950. This reduces the likelihood that a careless user may accidentally delete the new backup file. It also encourages the user to save future modified versions of the new backup file as separate files in order to prevent accidental purging of the modified files.

After changing the file attribute, the extraction status callback proceeds to step 955 where it queries the registry to determine whether the shortcut-creating feature of the backup method has been disabled. The term "shortcut" is well known to those familiar with Microsoft Windows95™, Microsoft Windows98™, and Microsoft Windows NT™. Shortcuts provide a convenient way to access files stored in various file directories. If the feature has been disabled, the extraction status callback proceeds to step 990 where it exits. If the feature is enabled, then the extraction status callback queries the registry to determine whether the new backup file is associated to an application program 960. This is done by comparing the filename extension of the new backup file to a list of filename extension associations in the registry. If no association is found, then the extraction status callback proceeds to step 990 where it exits. If an association is found, then the extraction status callback creates a shortcut to the new backup file and adds it to the registry 965. This addition to the registry allows the unfreezing program to identify the shortcut if the unfreezing program or the user wish to purge the shortcut at a later time. The shortcut is stored in the directory containing the original copy of the modified file and identifies the location of the new backup file extracted from the undo file. The new backup file may be accessed either directly, or by selecting the shortcut. After creating the shortcut and entering it in the registry, the extraction status callback exits 990.

Referring again to FIG. 3, when the function call to extract files 380 returns, the unfreezing program deletes the undo file 388 and unloads the SymMon device driver 395. The unfreezing program then returns to step 310 where it resumes waiting for applications to crash.

The above described, machine-implemented or otherwise carried out processes for saving data potentially modified by a crashed computer program may be provided by appropriate software. Such software can be introduced into computer system 200 of FIG. 2 by way of computer-readable media 275 or as electromagnetic, instructing signals 290. It has been explained above that system I/O module 280 may use system bus 255 for transferring data between one or more of the illustrated portions of computer system 200 and external devices. In one embodiment, the system I/O module 280 may couple the illustrated computer system 200 to a LAN (local area network), WAN (wide area network), or to other external data transceiving and processing means. Electromagnetic instructing signals for causing computer system 200 to perform in accordance with the above described procedures may enter by any one or more of such external data transceiving and processing means. Additionally and/or alternatively, the disk subsystem 270 which typically includes a drive (not separately shown) and a nonvolatile data storage medium (e.g., 275) may be used as memory and may be used for conveying part or all of the software instructing signals. The data storage medium 275 may be in the form of a magnetic hard disk, or a floppy diskette, or a re-writeable optical disk, or other such non-volatile, randomly accessible, re-writeable media. ROM or Flash EEPROM may be alternatively used in carrying out some or all of the nonvolatile data storing functions of the disk subsystem 270/275. It is understood that the data that is recorded on the disk subsystem 270/275 may be brought into subsystem 270 or into system memory 260 through a variety of data conveying means including but not limited to: floppy diskettes, compact-disks (CD ROM), tape, and over-a-network downloading by a file server computer or the like.

It should be understood that the particular embodiments described above are only illustrative of the principles of the present invention, and various modifications could be made by those skilled in the art without departing from the scope and spirit of the invention. For example, the device drivers could be modified to process additional calls made to the operating system made by the crashed program, or other programs. Alternatively, backup data files need not be compiled into an undo file and subsequently extracted. Rather, the original backup files could be retained in addition to, or instead of, an undo file. Thus, the scope of the present invention is limited only by the claims that follow.

Given the above disclosure of general concepts and specific embodiments, the scope of protection sought is to be defined only by the claims appended hereto.

What is claimed is:

1. A machine-implemented method for protecting stored data from potential corruption comprising the steps of:
   (a) intercepting an operating system call issued by an apparently crashed program, wherein said intercepted call requests a modification to said data; and
   (b) backing up said data before said data is potentially modified by said intercepted call.

2. The method of claim 1, wherein said apparently crashed program is an apparently crashed application program subject to an attempted revival by an unfreezing program.

3. The method of claim 1, wherein said intercepted call is one of:
   a request to rename an object;
   a request to write to a file;
   a request to open a file for writing thereto;
   a request to create a file; or
   a request to delete a file.

4. The method of claim 1, further comprising the step of:
   (c) communicating said backing up step to a user.

5. The method of claim 1, further comprising the step of:
   (c) logging said backing up step.

6. The method of claim 1, further comprising the step of:
   (c) passing said intercepted call to said operating system.

7. The method of claim 6, further comprising the step of:
   (d) modifying said intercepted call prior to said passing step.

8. The method of claim 1, wherein said backing up step stores said data in at least one backup file.

9. The method of claim 1, wherein said backing up step stores said data in an appendable undo file.

10. A computer adapted to protect stored data from potential corruption, said computer comprising:
    (a) a memory adapted to store program code; and
    (b) a processor in communication with said memory, said program code capable of causing said processor to:
       (b.1) intercept an operating system call issued by an apparently crashed program, wherein said intercepted call requests a modification to said data; and
       (b.2) back up said data before said data is potentially modified by said intercepted call.

11. The computer of claim 10, wherein said apparently crashed program is an apparently crashed application program subject to an attempted revival by an unfreezing program.

12. The computer of claim 10, wherein said intercepted call is one of:
    a request to rename an object;
    a request to write to a file;
    a request to open a file for writing thereto;
    a request to create a file; or
    a request to delete a file.

13. The computer of claim 10, said program code capable of further causing said processor to:
    (b.3) communicate said back up to a user.

14. The computer of claim 10, said program code capable of further causing said processor to:
    (b.3) log said back up.

15. The computer of claim 10, said program code capable of further causing said processor to:
    (b.3) pass said intercepted call to said operating system.

16. The computer of claim 15, said program code capable of further causing said processor to:
    (b.4) modify said intercepted call prior to causing said passing.

17. An apparatus for protecting stored data from potential corruption, comprising:
    (a) means for intercepting an operating system call issued by an apparently crashed program, wherein said intercepted call requests a modification to said data; and
    (b) means for backing up said data before said data is potentially modified by said intercepted call.

18. The apparatus of claim 17, wherein said apparently crashed program is an apparently crashed application program subject to an attempted revival by an unfreezing program.

19. The apparatus of claim 17, wherein said intercepted call is one of:
    a request to rename an object;
    a request to write to a file;
    a request to open a file for writing thereto;
    a request to create a file; or
    a request to delete a file.

20. The apparatus of claim 17, further comprising:
    (c) means for communicating said backing up to a user.

21. The apparatus of claim 17, further comprising:
    (c) means for logging said backing up.

22. The apparatus of claim 17, further comprising:
    (c) means for passing said intercepted call to said operating system.

23. The apparatus of claim 22, further comprising:
    (d) means for modifying said intercepted call prior to said passing.

24. An instruction conveying apparatus structured to convey code to an instructable machine, said code causing said machine to:
    (a) intercept an operating system call issued by an apparently crashed program, wherein said intercepted call requests a modification to stored data; and
    (b) back up said data before said data is potentially modified by said intercepted call.

25. The apparatus of claim 24, wherein said apparently crashed program is an apparently crashed application program subject to an attempted revival by an unfreezing program.

26. The apparatus of claim 24, wherein said intercepted call is one of:
    a request to rename an object;
    a request to write to a file;
    a request to open a file for writing thereto;
    a request to create a file; or
    a request to delete a file.

27. The apparatus of claim 24, said code further causing said machine to:

(c) communicate said back up to a user.

28. The apparatus of claim 24, said code further causing said machine to:

(c) log said back up.

29. The apparatus of claim 24, said code further causing said machine to:

(c) pass said intercepted call to said operating system.

30. The apparatus of claim 29, said code further causing said machine to:

(d) modify said intercepted call prior to said pass.

31. A manufactured instructing signal structured for causing an instructable machine to:

(a) intercept an operating system call issued by an apparently crashed program, wherein said intercepted call requests a modification to stored data; and (b) back up said data before said data is potentially modified by said intercepted call.

32. The signal of claim 31, wherein said apparently crashed program is an apparently crashed application program subject to an attempted revival by an unfreezing program.

33. The signal of claim 31, wherein said intercepted call is one of:

a request to rename an object;

a request to write to a file;

a request to open a file for writing thereto;

a request to create a file; or a request to delete a file.

34. The signal of claim 31, said signal further structured for causing said machine to:

(c) communicate said back up to a user.

35. The signal of claim 31, said signal further structured for causing said machine to:

(c) log said back up.

36. The signal of claim 31, said signal further structured for causing said machine to:

(c) pass said intercepted call to said operating system.

37. The signal of claim 36, said signal further structured for causing said machine to:

(d) modify said intercepted call prior to causing said passing.

* * * * *